US012596233B2

(12) United States Patent

Hsu et al.

(10) Patent No.: US 12,596,233 B2

(45) Date of Patent: Apr. 7, 2026

(54) FIBER OPTIC ADAPTER

(71) Applicants:Gloriole Electroptic Technology Corp., Kaohsiung (TW); SHEN ZHEN WONDERWIN TECHNOLOGY CO., LTD., Shenzhen (CN)

(72) Inventors: Hsien-Hsin Hsu, Kaohsiung (TW); Wu-Li Chu, Kaohsiung (TW); Yen-Chang Lee, Kaohsiung (TW); Shu-Bin Li, Shenzhen (CN)

(73) Assignees: Gloriole Electropic Technology Corp., Kaohsiung City (TW); SHEN ZHEN WONDERWIN TECHNOLOGY CO., LTD., Shenzhen City (CN)

( * ) Notice: Subject to any disclaimer, the term of this patent is extended or adjusted under 35 U.S.C. 154(b) by 504 days.

(21) Appl. No.: 18/336,369

(22) Filed: Jun. 16, 2023

(65) Prior Publication Data

US 2024/0329327 A1 Oct. 3, 2024

(30) Foreign Application Priority Data

Mar. 30, 2023 (TW) ................................ 112202957

(51) Int. Cl.
*G02B 6/38* (2006.01)

(52) U.S. Cl.
CPC ......... *G02B 6/3825* (2013.01); *G02B 6/3838* (2013.01); *G02B 6/3849* (2013.01); *G02B 6/3879* (2013.01); *G02B 6/3893* (2013.01); *G02B 6/3897* (2013.01)

(58) Field of Classification Search
CPC ...................................................... G02B 6/38

USPC ........................................................... 385/76
See application file for complete search history.

(56) References Cited

U.S. PATENT DOCUMENTS

| | | | | | |
|---|---|---|---|---|---|
| 4,260,247 | A | * | 4/1981 | Bennett ................ | G03B 21/134 |
| | | | | | 355/45 |
| 5,506,922 | A | * | 4/1996 | Grois ................... | G02B 6/3825 |
| | | | | | 385/75 |
| 5,687,268 | A | * | 11/1997 | Stephenson .......... | G02B 6/3849 |
| | | | | | 385/73 |
| 5,825,955 | A | * | 10/1998 | Ernst ................... | G02B 6/3846 |
| | | | | | 385/38 |

(Continued)

FOREIGN PATENT DOCUMENTS

| | | | | | |
|---|---|---|---|---|---|
| JP | | H07244229 A | * | 9/1995 | .......... G02B 6/3878 |
| WO | WO-2024086703 A1 | | * | 4/2024 | .......... G02B 6/3849 |

*Primary Examiner* — Kaveh C Kianni
(74) *Attorney, Agent, or Firm* — MUNCY, GEISSLER, OLDS & LOWE, P.C.

(57) ABSTRACT

A fiber optic adapter includes a shielding casing that is connected to a casing body and that defines a through channel. Two engagement members extend from a casing body and extend through the through channel. A pivot shaft engages the shielding casing. A shielding plate is connected to the pivot shaft. A restoring member is sleeved on the pivot shaft. The shielding plate is pivotable about the pivot shaft against a resilient force of the restoring member from a shielding position to an open position relative to the shielding casing. When the shielding plate is in the shielding position, the shielding plate is disposed between the engagement members and shields the through channel. When the shielding plate is in the open position, the shielding plate opens the through channel.

6 Claims, 11 Drawing Sheets

(56)  References Cited

U.S. PATENT DOCUMENTS

| | | | | |
|---|---|---|---|---|
| 5,956,444 | A * | 9/1999 | Duda | G02B 6/3825 385/140 |
| 6,595,696 | B1 * | 7/2003 | Zellak | G02B 6/3825 439/138 |
| 6,715,928 | B1 * | 4/2004 | Matasek | G02B 6/4277 385/56 |
| 7,648,286 | B2 * | 1/2010 | Nakagawa | G02B 6/4261 385/92 |
| 7,661,887 | B2 * | 2/2010 | Nakagawa | G02B 6/4296 385/92 |
| 8,821,031 | B2 * | 9/2014 | Lin | G02B 6/3849 385/59 |
| 9,195,013 | B2 * | 11/2015 | Yoshizaki | G02B 6/3869 |
| 9,453,963 | B2 * | 9/2016 | Sato | G02B 6/241 |
| 9,575,263 | B2 * | 2/2017 | Gurreri | G02B 6/3806 |
| 9,671,568 | B2 * | 6/2017 | Yoshizaki | G02B 6/3849 |
| 10,502,903 | B1 * | 12/2019 | Wang | G02B 6/3849 |
| 10,502,904 | B2 * | 12/2019 | Yang | G02B 6/3825 |
| 11,609,384 | B2 * | 3/2023 | Milchtein Peltsverger | G02B 6/3893 |
| 12,265,264 | B2 * | 4/2025 | Gibbs | G02B 6/3849 |
| 2003/0147597 | A1 * | 8/2003 | Duran | G02B 6/3849 385/76 |
| 2003/0180005 | A1 * | 9/2003 | McBride | G02B 6/3825 385/73 |
| 2004/0223701 | A1 * | 11/2004 | Tanaka | G02B 6/3885 385/55 |
| 2005/0058402 | A1 * | 3/2005 | Ernst | G02B 6/4277 385/56 |
| 2005/0286833 | A1 * | 12/2005 | Kramer | G02B 6/3825 385/53 |
| 2006/0094273 | A1 * | 5/2006 | Mine | G02B 6/3849 439/137 |
| 2008/0317414 | A1 * | 12/2008 | Nakagawa | G02B 6/4261 385/76 |
| 2008/0317428 | A1 * | 12/2008 | Nakagawa | G02B 6/4296 385/139 |
| 2011/0206325 | A1 * | 8/2011 | Hioki | G02B 6/3849 385/76 |
| 2014/0205239 | A1 * | 7/2014 | Sato | G02B 6/3893 385/55 |
| 2015/0078710 | A1 * | 3/2015 | Sato | G02B 6/3849 385/78 |
| 2017/0248762 | A1 * | 8/2017 | Sato | G02B 6/3825 |
| 2019/0212502 | A1 * | 7/2019 | Hsu | G02B 6/3825 |
| 2020/0003960 | A1 * | 1/2020 | Hsu | G02B 6/387 |
| 2020/0341208 | A1 * | 10/2020 | Verheyden | G02B 6/3849 |
| 2020/0341209 | A1 * | 10/2020 | Higley | G02B 6/3825 |
| 2022/0011520 | A1 * | 1/2022 | Sato | G02B 6/381 |

* cited by examiner

FIBER OPTIC ADAPTER

CROSS-REFERENCE TO RELATED APPLICATION

This application claims priority to Taiwanese Utility Model Patent Application No. 112202957, filed on Mar. 30, 2023.

FIELD

The disclosure relates to a fiber optic adapter, and more particularly to a fiber optic adapter having a security function of light blocking and a dustproof function.

BACKGROUND

An optical fiber in a communication apparatus is used for signal transmission through a high-intensity beam. When it is desired to couple optical fibers, a fiber optic connector having the optical fiber may be inserted into an insertion slot of a fiber optic adapter, and mate with another fiber optic connector having another optical fiber and being inserted into an opposite end of the fiber optic adapter, so that a light beam may be transmitted between the optical fibers. However, when only one fiber optic connector is connected to one side of the fiber optic adapter, and when the other side of the fiber optic adapter is uncoupled from another fiber optic connector, the high intensity beam emitted by the fiber optic connector will pass through the insertion slot, and emit outwards at the opposite end of the fiber optic adapter. When a user unintentionally looks at the insertion slot, the user's eyes may be easily and directly injured by the high intensity light beam. Furthermore, the optical fibers are often disposed in a dust intensive environment. When dust is introduced into the fiber optic adapter, it often causes damage to a terminal of the fiber optic connector, thereby causing power loss of light transmissions.

Referring to FIG. 1, in order to prevent the above situation from occurring, a conventional fiber optic adapter 1 is provided with an operable flip cover 11. When only one fiber optic connector (not shown in FIG. 1) is inserted into the fiber optic adapter 1, the flip cover 11 will cover a corresponding one the insertion slot 12 that is unoccupied, thereby preventing the high intensity light beam from emitting outward. However, when another fiber optic connector (not shown in FIG. 1) needs to be inserted into the unoccupied insertion slot 12, the flip cover 11 has to be manually opened so as to expose the unoccupied insertion slot 12, so that another fiber optic connector is allowed to be inserted into the unoccupied insertion slot 12. Furthermore, when the fiber optic connector is yet coupled to the adaptor, it is troublesome that the flip cover 11 has to be manually operated to close the insertion slot 12.

Referring to FIG. 2, in order to resolve complexity of operation, another conventional fiber optic adapter 2 is equipped with a metal stop plate 21 that is bendable. When a fiber optic connector 22 is not inserted into the conventional fiber optic adapter 2, the metal stop plate 21 blocks the corresponding insertion slot 23. During insertion of the fiber optic connector 22 into the corresponding insertion slot 23, the fiber optic connector 22 pushes the metal stop plate 21 aside via elasticity of the metal stop plate 21, and is inserted into the corresponding slot 23. Although such a design may reduce the operational complexity, due to the metal material of the metal stop plate 21, the metal stop plate 21 is prone to generating a greater amount of reflection when blocking light beams, thereby being inefficient for high-resolution communication. In addition, the metal stop plate 21 is prone to breakage due to metal fatigue and frequent deformations, thereby resulting in a short lifespan of the fiber optic adapter 2.

SUMMARY

Therefore, an object of the disclosure is to provide a fiber optic adapter that can alleviate at least one of the drawbacks of the prior art.

According to the disclosure, the fiber optic adapter includes a main body unit and a shielding unit.

The main body unit includes a casing body, two engagement members, and two fastener members. The casing body defines an insertion channel extending along a front-rear direction. The engagement members extend from the casing body along the front-rear direction. The fastener members extend from the casing body along the front-rear direction opposite to the engagement members.

The shielding unit includes a shielding casing and a shielding mechanism. The shielding casing is removably connected to the casing body and defines a through channel. The engagement members extends through the through channel. The shielding mechanism has a pivot shaft, a restoring member, and a shielding plate. The pivot shaft engages the shielding casing and faces the through channel. The restoring member is sleeved on the pivot shaft. The shielding plate is pivotally connected to the pivot shaft. The restoring member has opposite ends that abut respectively and resiliently against the shielding casing and the shielding plate. The shielding plate is pivotable about the pivot shaft against a resilient force of the restoring member from a shielding position to an open position relative to the shielding casing.

When the shielding plate is in the shielding position, the shielding plate is disposed between the engagement members, is substantially perpendicular to the front-rear direction, and shields the through channel.

When the shielding plate is in the open position, the shielding plate is substantially parallel with the front-rear direction and opens the through channel.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
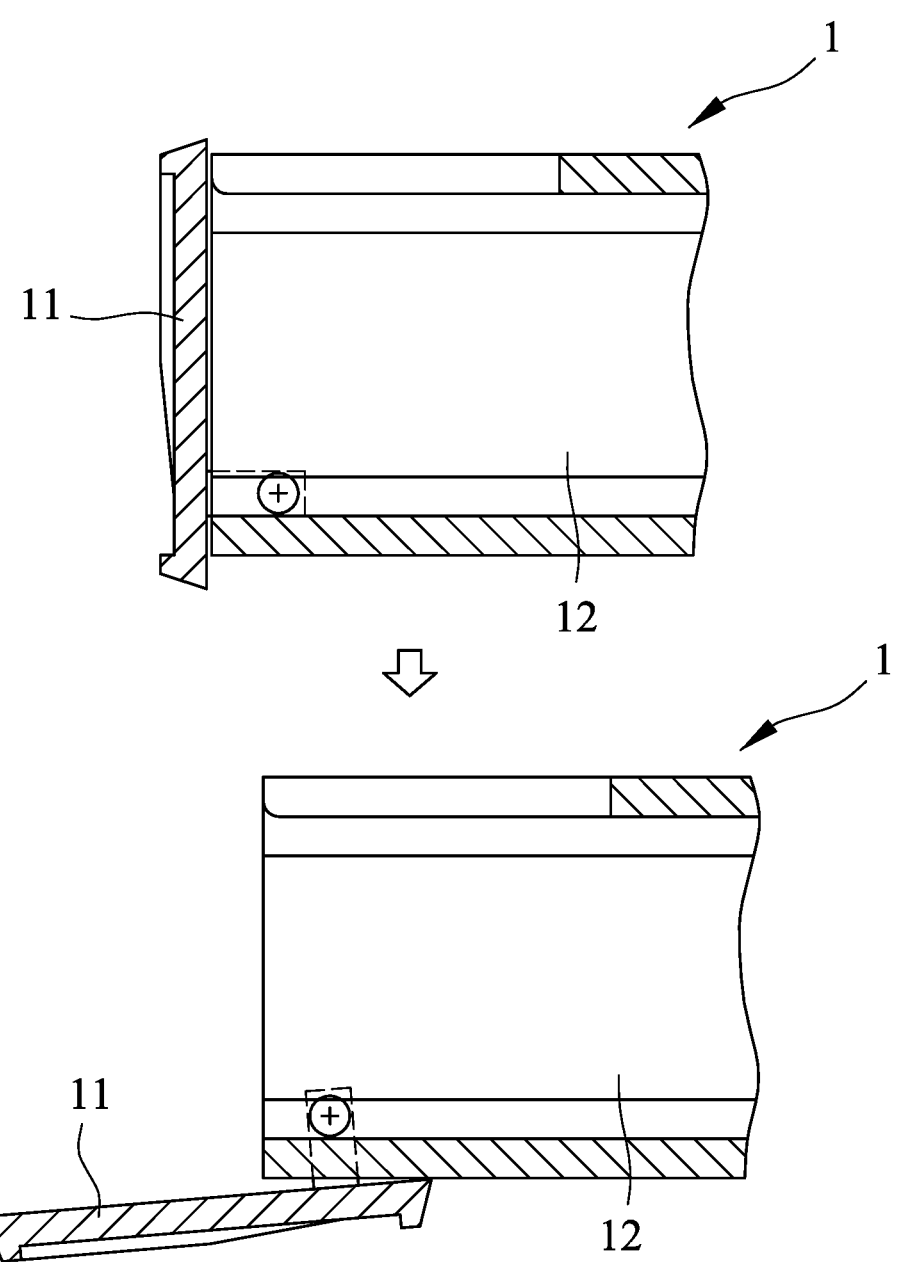
FIG. 1 is a schematic sectional view illustrating a conventional fiber optic adapter with a flip cover design.
Figure 2:
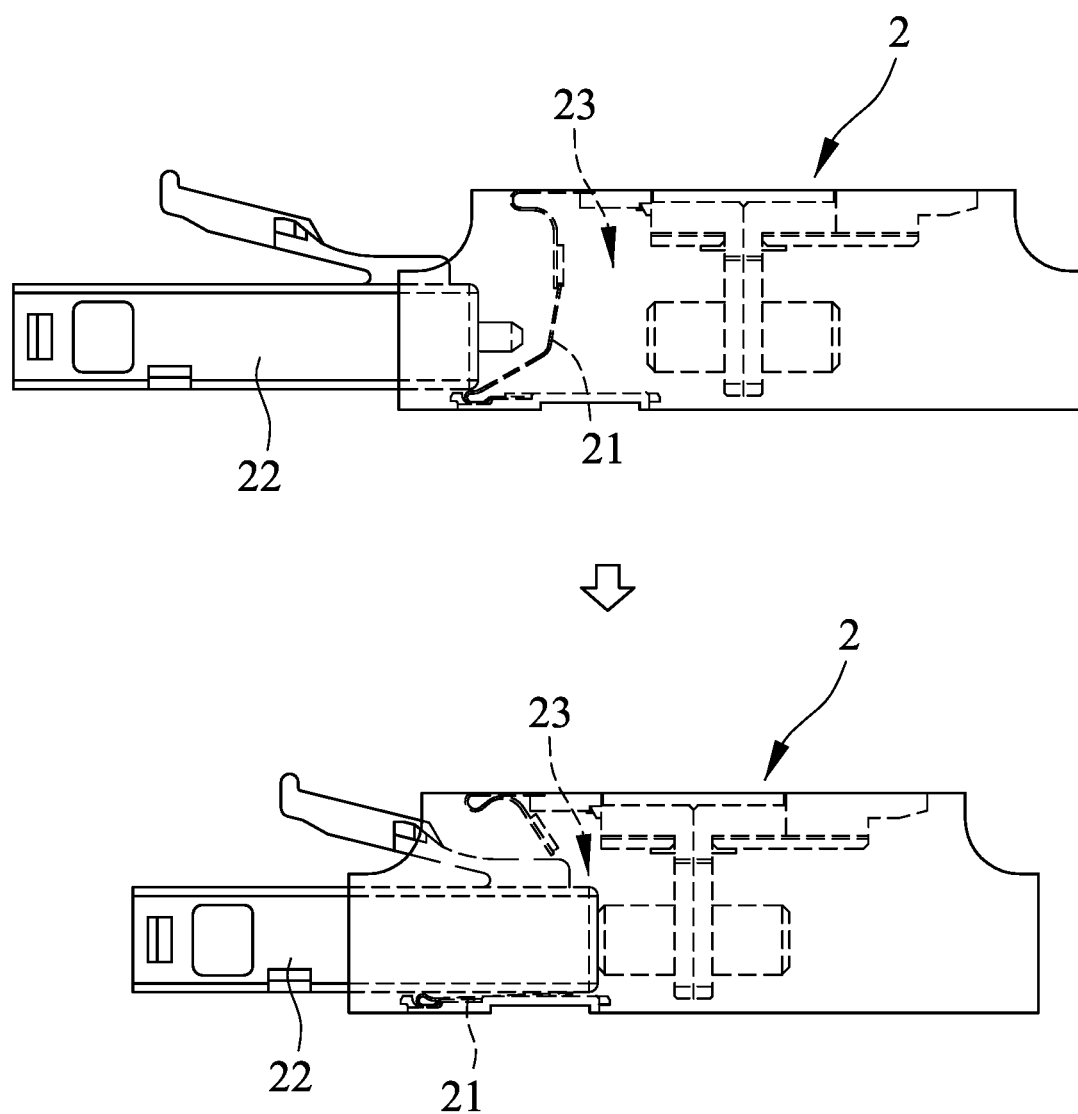
FIG. 2 is a schematic view of a conventional fiber optic adapter with a metal stop plate.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
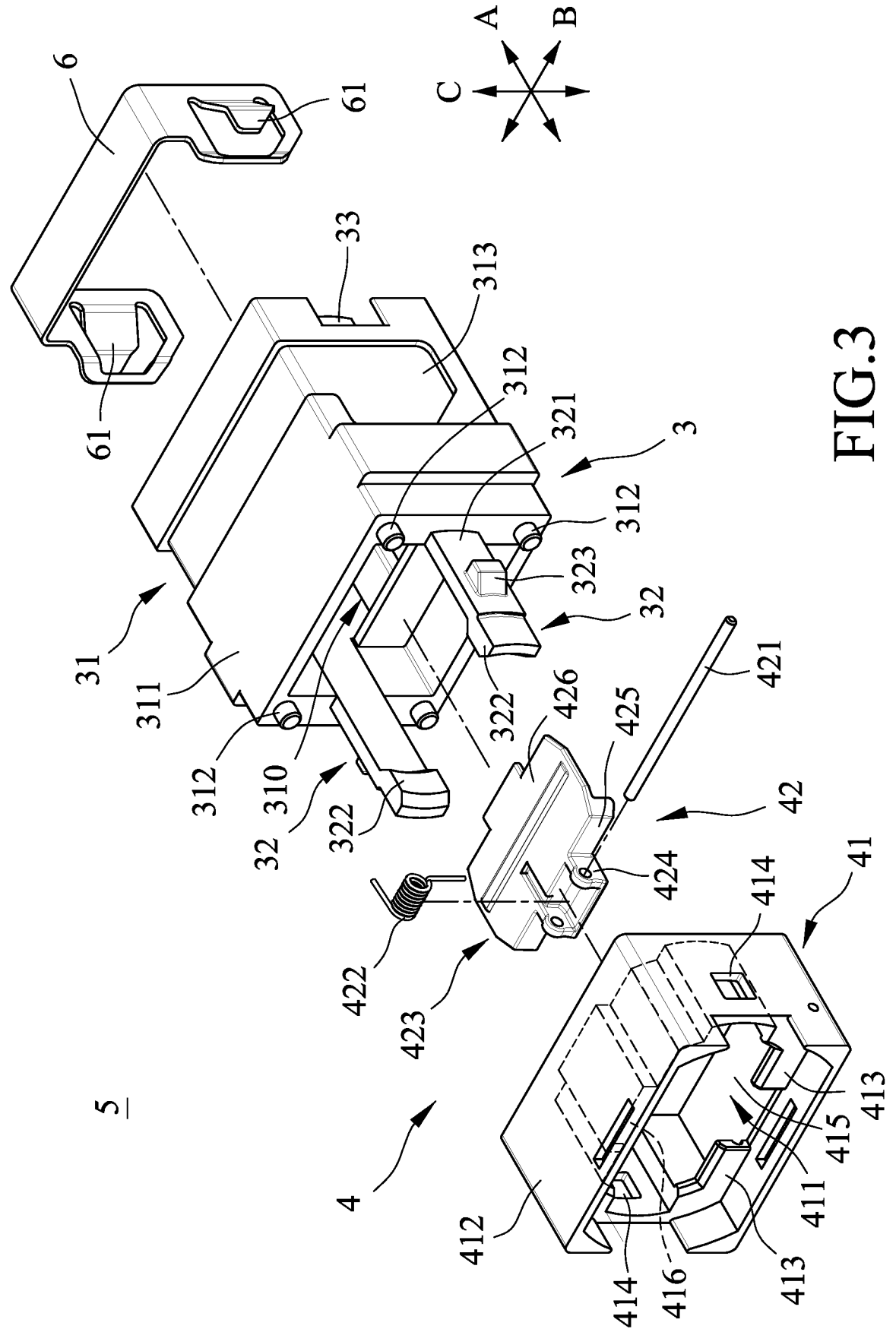
FIG. 3 is a perspective view of an embodiment of a fiber optic adapter according to the present disclosure.
Figure 4:
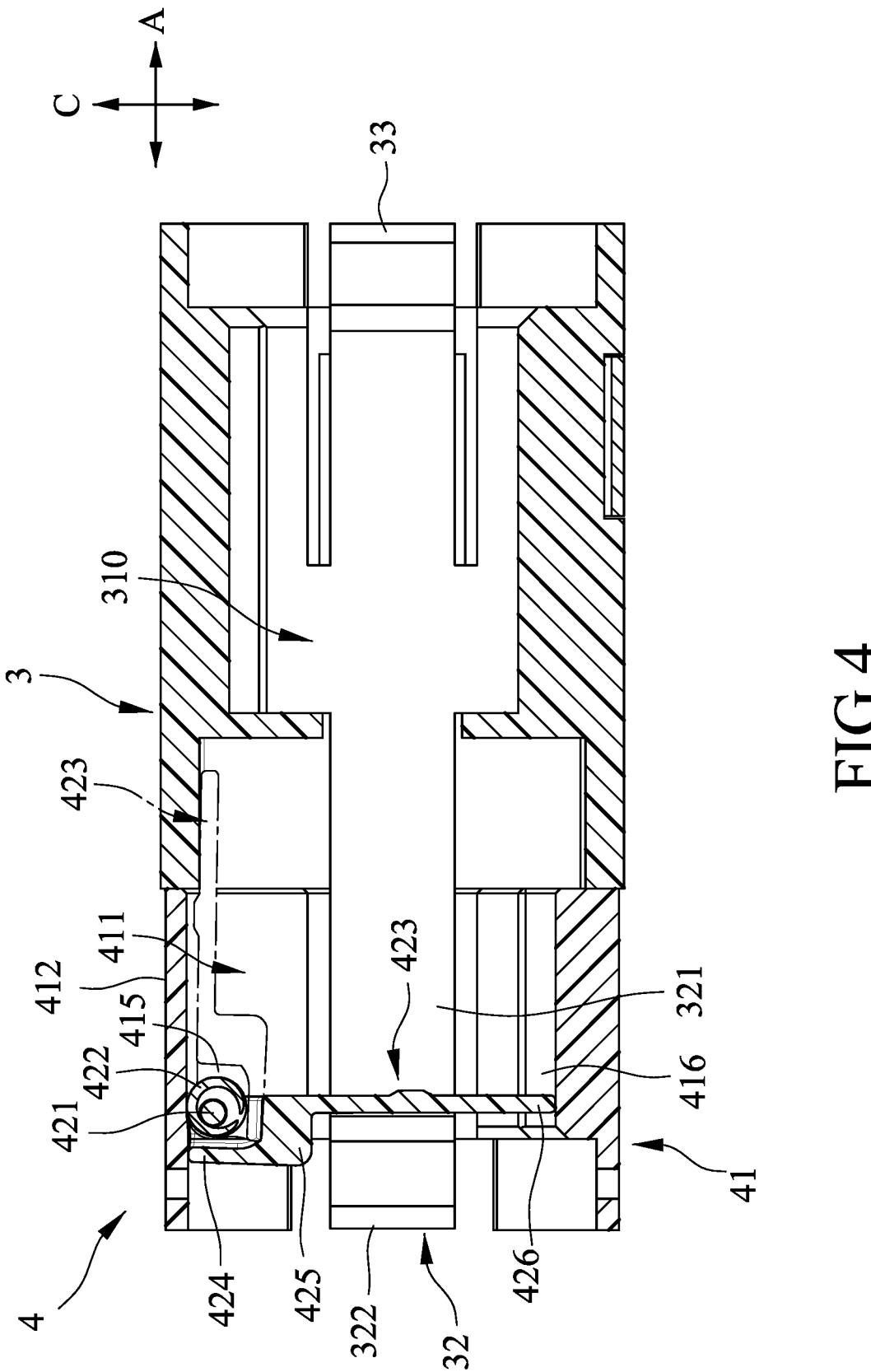
FIG. 4 is a side sectional view of FIG. 3.
Figure 5:
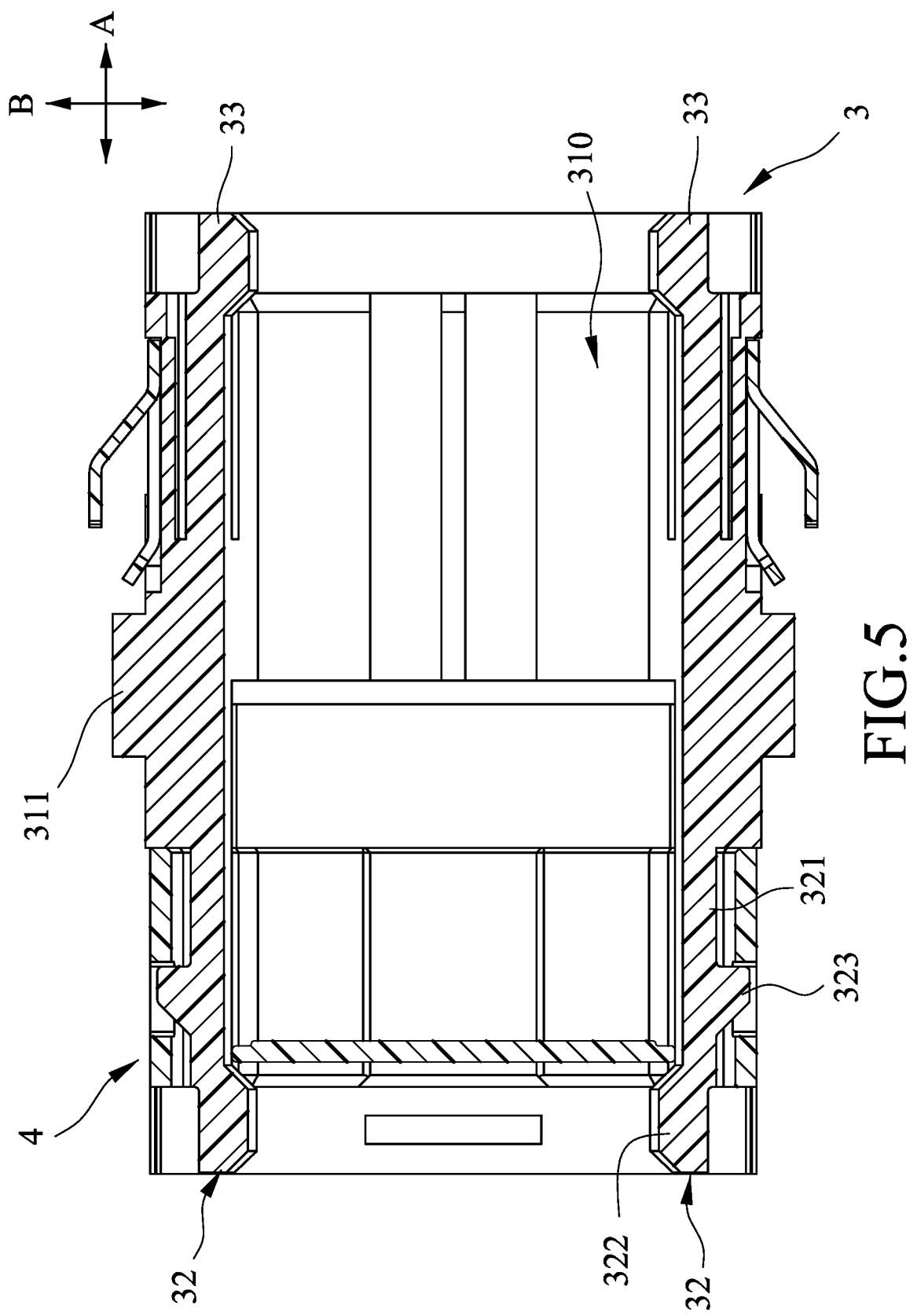
FIG. 5 is a top sectional view of FIG. 3.

FIGS. 3, 4, and 5 illustrate a fiber optic adapter 5 according to an embodiment of the disclosure. The fiber optic adapter 5 includes a main body unit 3 and a shielding unit 4. It should be noted that, in order to facilitate understanding of the fiber optic adapter 5 from different viewing angles, the fiber optic adapter 5 shown in FIG. 3 is oriented opposite to that in other Figures.

The main body unit 3 includes a casing body 31, two engagement members 32, and two fastener members 33. The casing body 31 has a main casing portion 311 and four protrusions 312. The main casing portion 311 surrounds an insertion channel 310 that extends along a front-rear direction (A). The protrusions 312 protrude from the main casing portion 311 along the front-rear direction (A). The engagement members 32 extend from the casing body 31 in a same direction as the protrusions 312 along the front-rear direction (A). Each of the engagement members 32 has an extension portion 321, a hook portion 322, and an engagement portion 323. For each of the engagement protrusions 32, the extension portion 321 extends from the main casing portion 311 along the front-rear direction (A); the hook portion 322 extends from the extension portion 321 along a first lateral direction (B) perpendicular to the front-rear direction (A) and protrudes toward another one of the engagement members 32; the engagement portion 323 extends from the extension portion 321 opposite to the hook portion 322 along the first lateral direction (B). The fastener members 33 extend from the casing body 31 along the front-rear direction (A) opposite to the engagement members 32. In this embodiment, the hook portion 322 of each of the engagement protrusions 32 is distant along the front-rear direction (A) from the casing body 31 than the engagement portion 323.

Figure 6:
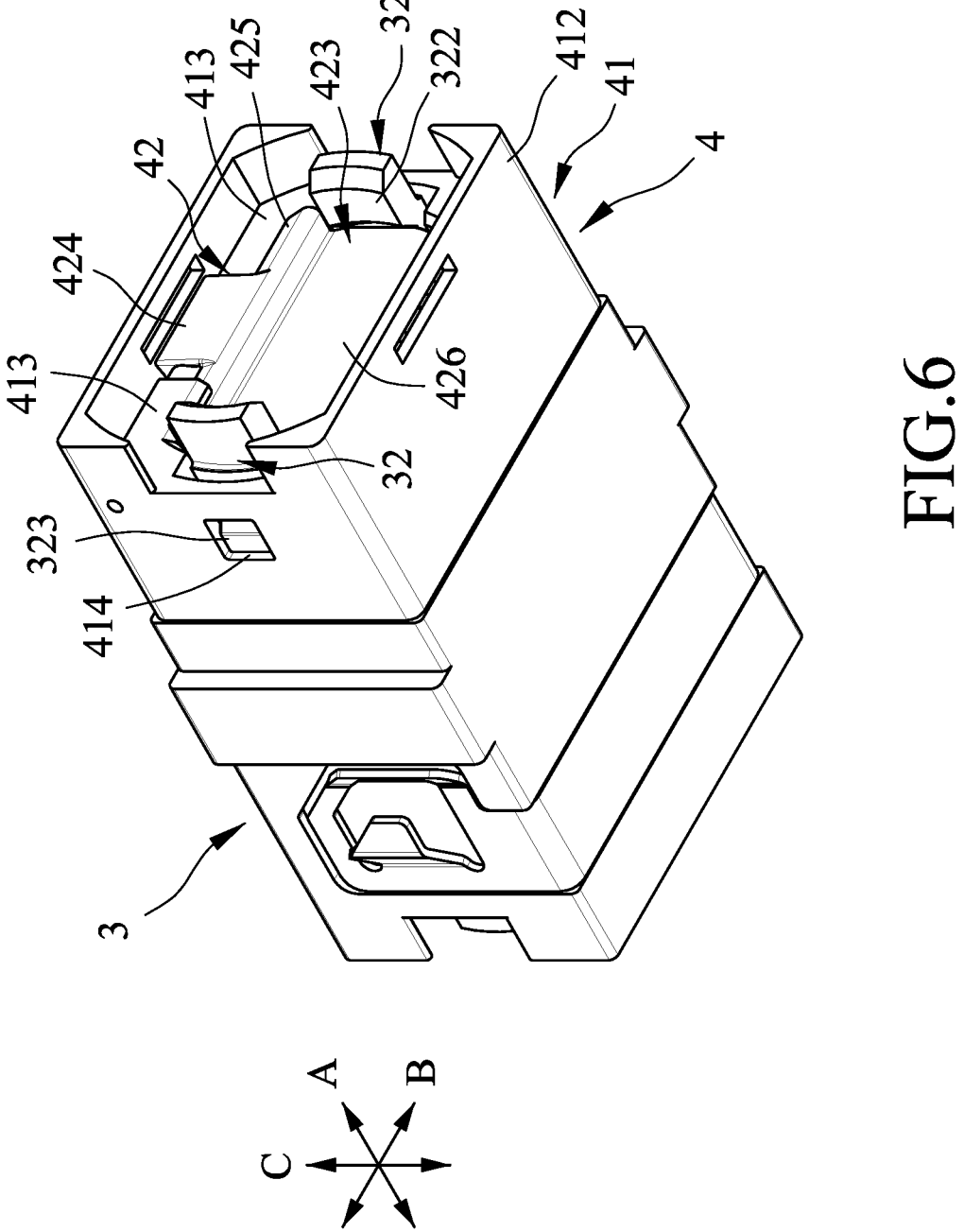
FIG. 6 is an exploded perspective view of the embodiment, illustrating a shielding plate in a shielding position.

Referring to FIG. 6 in combination with FIGS. 3 and 4, the shielding unit 4 includes a shielding casing 41 and a shielding mechanism 42.

The shielding casing 41 is removably connected to the casing body 31 and defines a through channel 411 extending along the front-rear direction (A). The engagement members 32 extends through the through channel 411, and the protrusions 312 engage the shielding casing 41 by extending respectively engaging holes (not show) formed in the shielding casing 41. The shielding casing 41 has a surrounding wall portion 412 and two end seat portions 413. The surrounding wall portion 412 surrounds the through channel 411. The end seat portions 413 protrude from an inner surface of the surrounding wall portion 412, face the through channel 411, and are spaced apart from each other along the first lateral direction (B). The through channel 411 is aligned with the insertion channel 310 of the casing body 31. The surrounding wall portion 412 has two engagement holes 414 that are in communication with the through channels 411, and that are respectively engaged with the engagement portions 323 of the engagement members 32. The surrounding wall portion 412, one end of one of the end seat portions 413, and one end of another one of the end seat portions 413 cooperatively define a disposition groove 415 in communication with the through channels 411. The surrounding wall portion 412, another end of one of the end seat portions 413, and another end of another one of the end seat portions 413 cooperatively define a polarity groove 416 in communication with the through channels 411. In this embodiment, each of the end seat portions 413 is substantially C-shaped and open toward the other one of the end seat portions 413 along the first lateral direction (B). The disposition groove 415 and the polarity groove 416 are opposite to each other along a second lateral direction (C) perpendicular to the front-rear direction (A) and the first lateral direction (B). However, the fiber optic adapter 5 of the disclosure is not limited in this regard.

The shielding mechanism 42 has a pivot shaft 421, a restoring member 422, and a shielding plate 423. The pivot shaft 421 engages the shielding casing 41 and faces the through channel 411. The pivot shaft 421 has two opposite ends that are respectively and pivotally connected to the end seat portions 413. The restoring member 422 is sleeved on the pivot shaft 421. The restoring member 422 is disposed between the end seat portions 413 and is disposed in the disposition groove 415. The restoring member 422 and the end seat portions 413 are arranged along the first lateral direction (B). The shielding plate 423 is pivotally connected to the pivot shaft 421.

As shown in FIG. 3, in this embodiment, the restoring member 422 is a torsion spring and has opposite ends that abut respectively and resiliently against the surrounding wall portion 412 of the shielding casing 41 and the shielding plate 423. The shielding plate 423 has a pivotal portion 424, a positioning portion 425, and a shielding portion 426. The pivotal portion 424 is disposed between the end seat portions 413. The pivotal portion 424 and the end seat portions 413 are arranged along the first lateral direction (B). The pivot shaft 421 extends through the pivotal portion 424. The positioning portion 425 is connected to the pivotal portion 424 and has a length along the first lateral direction (B) greater than that of the pivotal portion 424. The shielding portion 426 extends from the positioning portion 425 away from the pivotal portion 424.

Figure 9:
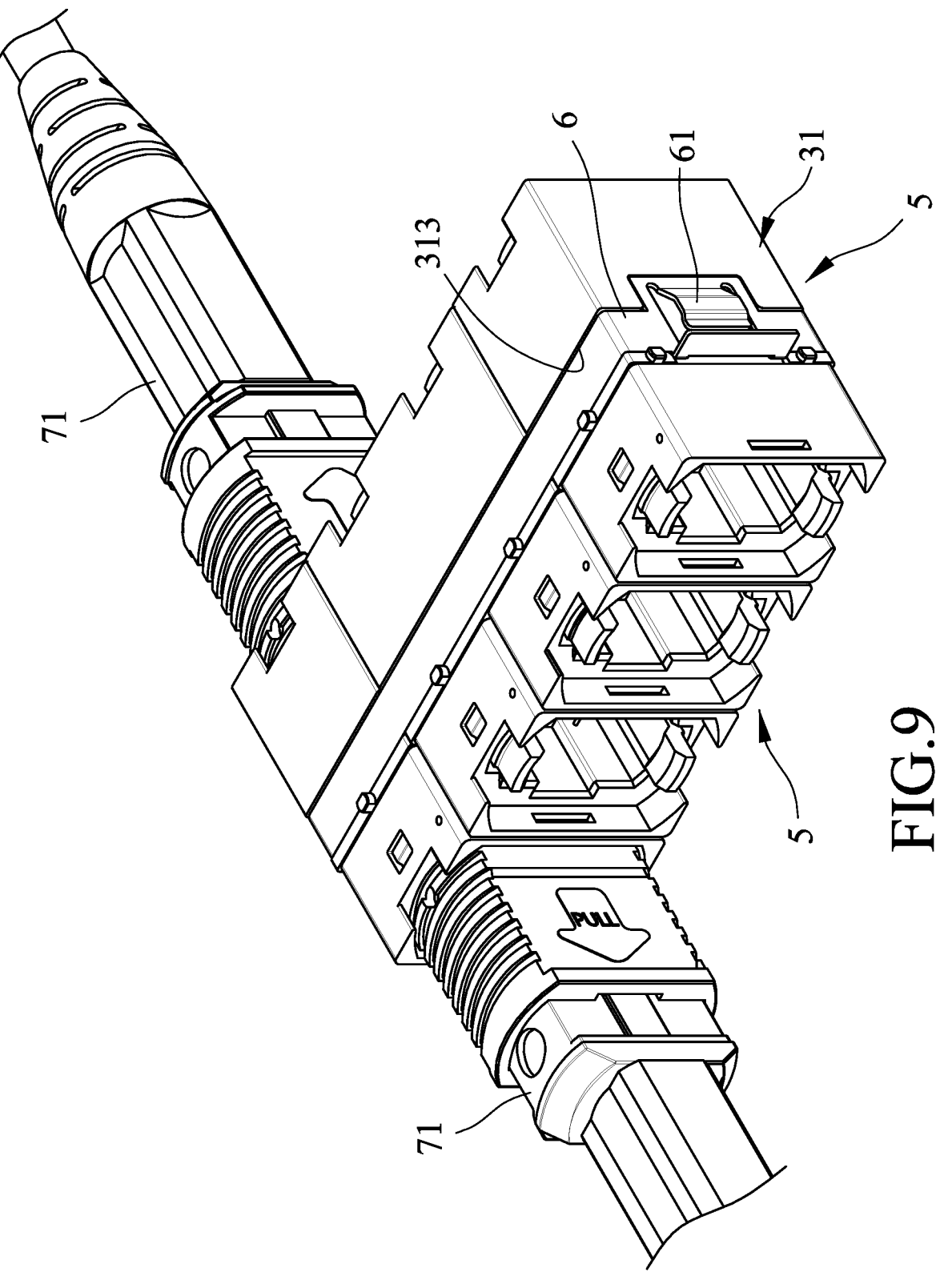
FIG. 9 is a fragmentary perspective view illustrating the fiber optic adapters in an assembled state.

Referring back to FIG. 6 in combination with FIGS. 3 and 4, the shielding plate 423 is pivotable about the pivot shaft 421 against a resilient force of the restoring member 422 from a shielding position to an open position relative to the shielding casing 41. When the shielding plate 423 is in the shielding position, as indicated by solid lines in FIG. 4 or shown in FIG. 6, the shielding plate 423 is disposed between the engagement members 32, is substantially perpendicular to the front-rear direction (A) and parallel with the second lateral direction (C), and shields the through channel 411 to shield light from escaping from the through channel 411 and the insertion channel 310 while a fiber optic connector (as shown in FIG. 9) is inserted into the insertion channel 310 opposite to the shielding unit 4. In this embodiment, when the shielding plate 423 is in the shielding position, the shielding portion 426 are parallel to the second lateral direction (C), and the positioning portion 425 and the shielding portion 426 abut against the end seat portions 413. Specifically, when the shielding plate 423 is in the shielding position, because the shielding plate 423 is disposed between the engagement members 32, the hook portion 322 of each of the engagement members 32 is disposed outside the through channel 411, and the shielding plate 423 is not adversely affected by the hook portions 322 of the engagement members 32. As a result, when the shielding plate 423 in the shielding position shields the through channel 411, dust is prevented by the shielding plate 423 from entering the through channel 411, and light is shielded by the shielding plate 423 from escaping from the through channel 411.

It should be note that the shielding casing 41 is removably connected to the casing body 31. After the shielding casing 41 is removed from the casing body 31 and rotated 180 degrees, and is connected again to the casing body 31, the polarity groove 416 and the disposition groove 415 of the shielding casing 41 are swapped in position relative to each other so that the fiber optic adapter 5 may quickly be coupled to the fiber optic connector according to polarity of the fiber optic connector.

Figure 7:
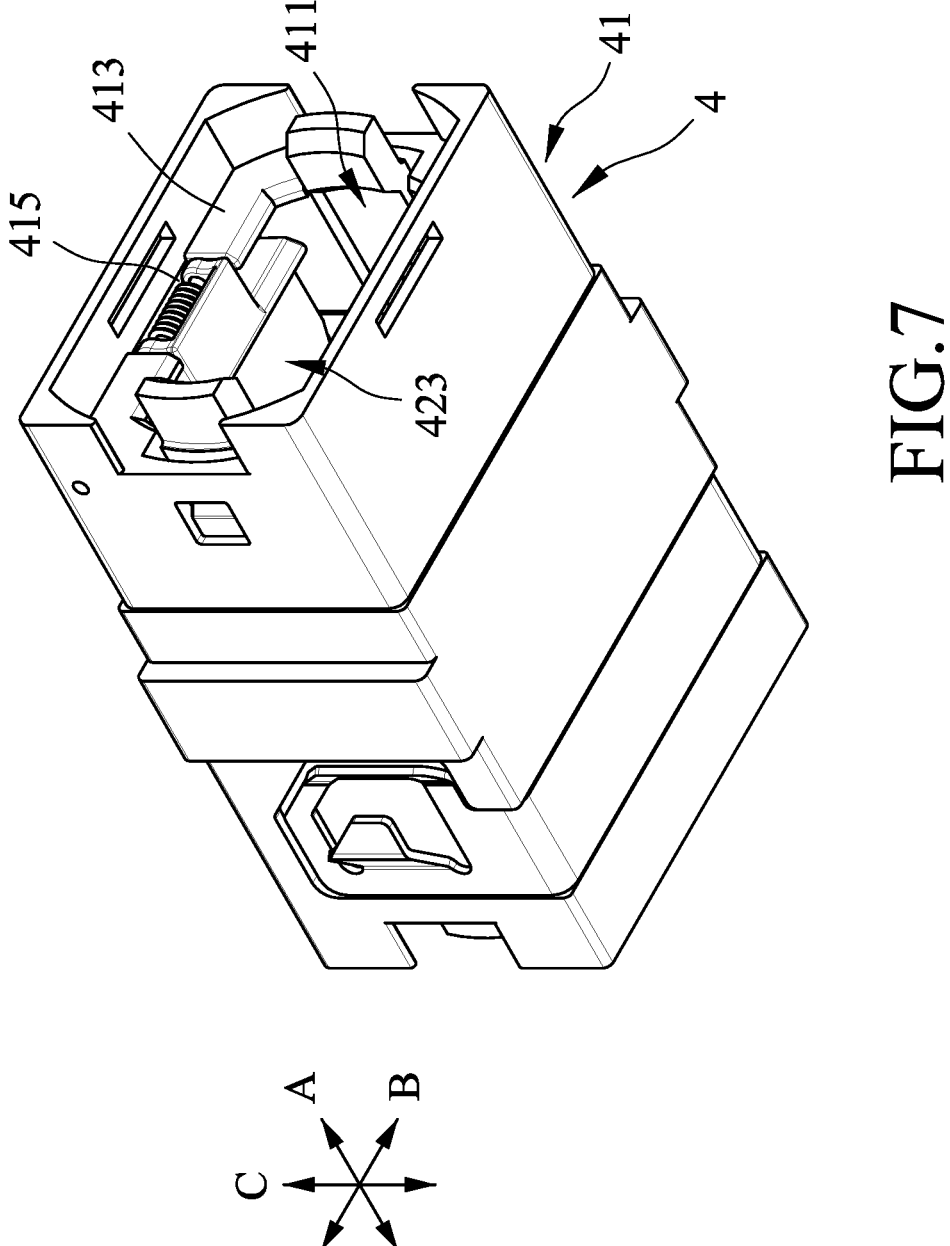
FIG. 7 is an exploded perspective view of the embodiment, illustrating the shielding plate in an open position.
Figure 10:
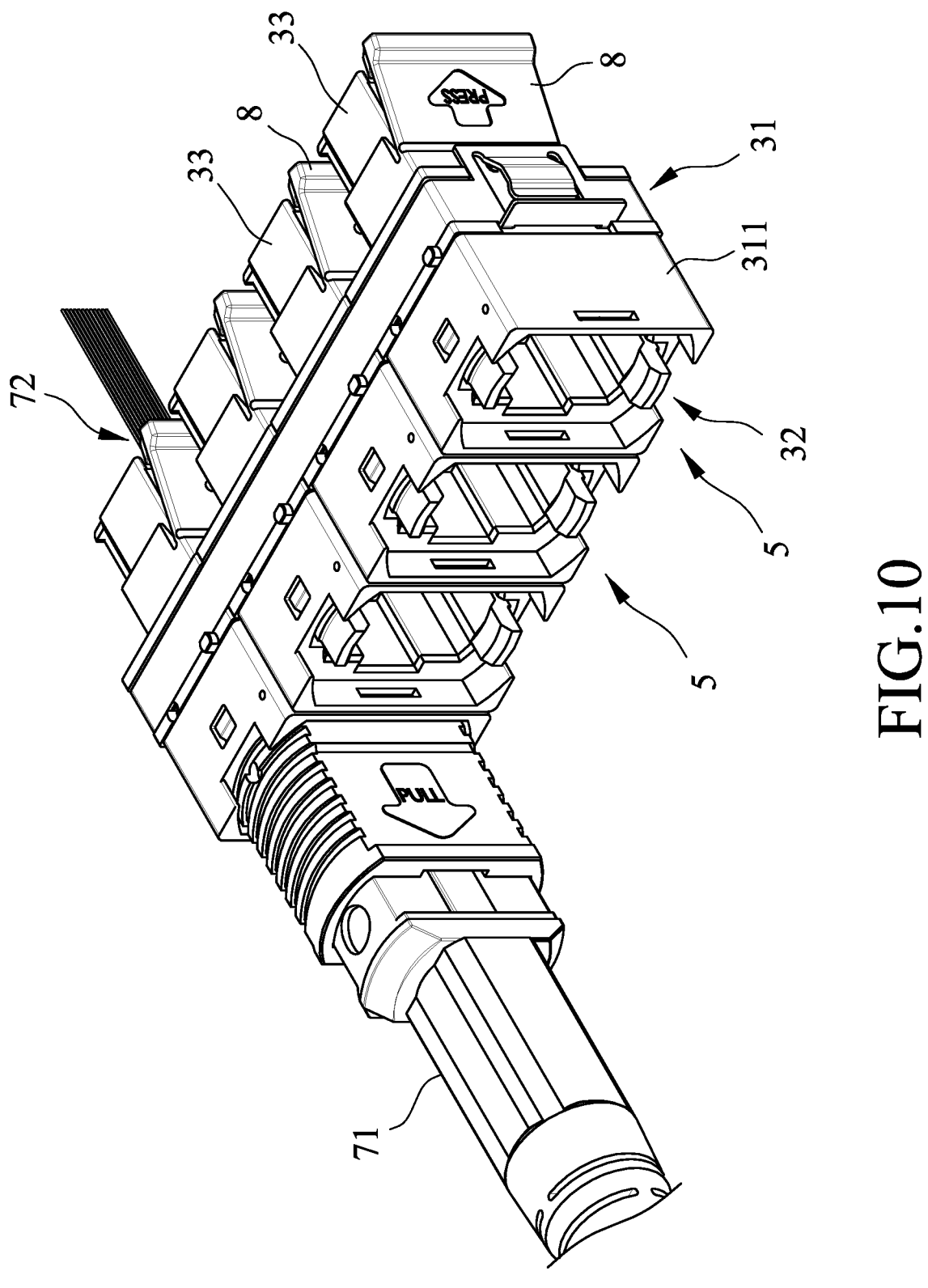
FIG. 10 is a fragmentary perspective view illustrating the fiber optic adapters in the assembled state connecting fiber optic connectors of different types by using a plurality of casing sleeves.
Figure 11:
FIG. 11 is an exploded perspective view illustrating the fiber optic adapters and the casing sleeves being disassembled while the fiber optic connectors are omitted.

Referring to FIG. 7 in combination with FIGS. 3, 4, and 5, when a fiber optic connector (such as the connector shown in FIGS. 9 and 10) is inserted along the front-rear direction (A) into the through channel 411 opposite to the fastener members 33, the shielding plate 423 is pushed by the fiber optic connector to the open position. When the shielding plate 423 is in the open position, as indicated by phantom lines in FIG. 4 or shown in FIG. 7, the shielding plate 423 is substantially parallel with the front-rear direction (A) and opens the through channel 411, and the positioning portion 425 and the end seat portions 413 are spaced apart along the front-rear direction (A). As a result, the fiber optic connector is inserted into the insertion channel 310 through the through channel 411.

It should be noted that, in this embodiment, the fiber optic adapter 5 in design enables a user to operate the shielding plate 423 without using hand or a tool, thereby simplifying and facilitating operation. In addition, unlike the metal sheet in the prior art being prone to breakage due to metal fatigue and frequent deformations, the configuration of the fiber optic adapter 5 may prevent the shielding plate 423 from breakage, thereby increasing service life and reliability.

Figure 8:
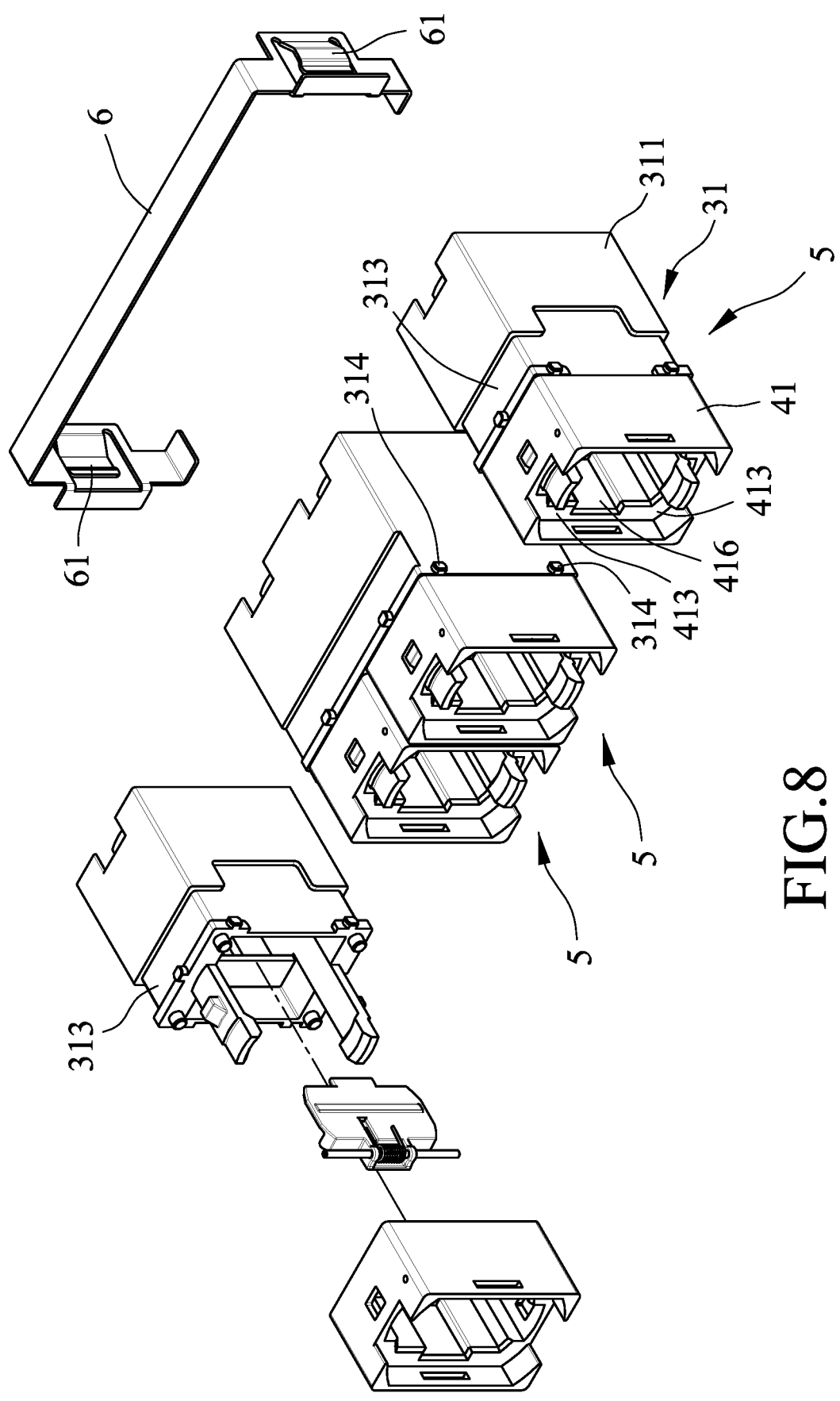
FIG. 8 is an exploded perspective view illustrating a plurality of the fiber optic adapters in practical applications.

Referring to FIGS. 8 and 9 in combination with FIG. 3, in practical use, a plurality of the fiber optic adapters 5 may be juxtaposed to each other in a row for connection of the same fiber optic connectors 71. For each of the fiber optic adapters 5, a limiting groove 313 is formed in the main casing portion 311, a plurality of tenons 314 protrude from the casing portion 311, and the main casing portion 311 is formed with a plurality of tenon holes (not shown). The tenons 314 of one of the fiber optic adapters 5 are inserted into the tenon holes of an adjacent one of the fiber optic adapters 5, thereby initially fixing the fiber optic adapters 5. Subsequently, a fastener member 6 is engaged in the limiting grooves 313 of the fiber optic adapters 5, thereby fastening the fiber optic adapters 5 together. Two tongues 61 are mounted to the fastener member 6 so that the fiber optic adapters 5 together may be mounted to an apparatus. As aforementioned, for each of the fiber optic adapters 5, the polarity groove 416 and the disposition groove 415 of the shielding casing 41 are swapped in position relative to each other by removing and reinstalling the shielding casing 41 so as to be quickly adapted to polarity of the fiber optic connector.

Referring to Figured 10 and 11, when there is a need to connect the fiber optic connectors 71, 72 of different types, for each of the fiber optic adapters 5, a casing sleeve 8 is sleeved on the main casing portion 311 of the casing 31 and surrounds the fastener members 33. By virtue of the casing sleeve 8 in a configuration, the fiber optic adapter 5 is adapted to connect the fiber optic connectors 71, 72 of different types, thereby increasing general usage.

In summary, when the through channel 411 of the shielding casing 41 is unoccupied, the resilient force of the restoring member 422 resiliently restores the shielding plate 423 to the shielding position, thereby achieving dustproof and light-shielding effects. When the fiber optic connector needs to be inserted into the insertion channel 310 through the through channel 411, as long as the fiber optic connector pushes the shielding plate 423 to the open position, the fiber optic connector may be inserted into the insertion channel 310 through the through channel 411.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A fiber optic adapter comprising:
a main body unit including
   a casing body that defines an insertion channel extending along a front-rear direction,
   two engagement members that extend from said casing body along the front-rear direction, and
   two fastener members that extend from said casing body along the front-rear direction opposite to said engagement members; and
a shielding unit including a shielding casing that is removably connected to said casing body and that defines a through channel, said engagement members extending through said through channel, and a shielding mechanism that has a pivot shaft engaging said shielding casing and facing said through channel, a restoring member sleeved on said pivot shaft, and a shielding plate pivotally connected to said pivot shaft, said restoring member having opposite ends that abut respectively and resiliently against said shielding casing and said shielding plate, said shielding plate being pivotable about said pivot shaft against a resilient force of said restoring member from a shielding position to an open position relative to said shielding casing;

wherein, when said shielding plate is in the shielding position, said shielding plate is disposed between said engagement members, is substantially perpendicular to the front-rear direction, and shields said through channel; and wherein, when said shielding plate is in the open position, said shielding plate is substantially parallel with the front-rear direction and opens said through channel.

2. The fiber optic adapter as claimed in claim 1, wherein: said shielding casing has a surrounding wall portion that surrounds said through channel, and two end seat portions that protrude from said surrounding wall portion, that face said through channel, and that are spaced apart from each other along a first lateral direction perpendicular to the front-rear direction;

said pivot shaft has two opposite ends that are respectively and pivotally connected to said end seat portions; and said restoring member is disposed between said end seat portions, said restoring member and said end seat portions being arranged along the first lateral direction.

3. The fiber optic adapter as claimed in claim 2, wherein: said shielding plate has a pivotal portion that is disposed between said end seat portions, said pivotal portion and said end seat portions being arranged along the first lateral direction, said pivot shaft extending through said pivotal portion, a positioning portion that is connected to said pivotal portion and that has a length along the first lateral direction greater than that of said pivotal portion, and a shielding portion that extends from said positioning portion away from said pivotal portion;

when said shielding plate is in the shielding position, said shielding portion are parallel to a second lateral direction perpendicular to the front-rear direction and the first lateral direction, and said positioning portion and said shielding portion abut against said end seat portions;

when said shielding plate is in the open position, said positioning portion and said end seat portions are spaced apart along the front-rear direction.

4. The fiber optic adapter as claimed in claim 1, wherein said casing body has:

a main casing portion that surrounds said insertion channel; and a plurality of protrusions that protrude from said main casing portion along the front-rear direction and that engage said shielding unit.

5. The fiber optic adapter as claimed in claim 2, wherein: each of said engagement members has an extension portion that extends from said casing body along the front-rear direction, a hook portion that extends from said extension portion along the first lateral direction toward another one of said engagement members, and an engagement portion that extends from said extension portion opposite to said hook portion;

said surrounding wall portion of said shielding casing has two engagement holes that are in communication with said through channels, and that are respectively engaged with said engagement portions of said engagement members; and when said shielding plate is in the shielding position, said hook portion of each of said engagement members is disposed outside said through channels.

6. The fiber optic adapter as claimed in claim 2, wherein: said surrounding wall portion, one end of one of said end seat portions, and one end of another one of said end seat portions cooperatively define a disposition groove in communication with said through channels, said restoring member being disposed in said disposition groove; and said surrounding wall portion, another end of one of said end seat portions, and another end of another one of said end seat portions cooperatively define a polarity groove in communication with said through channels.

* * * * *